United States Patent
Devireddy

(10) Patent No.: US 11,153,169 B2
(45) Date of Patent: Oct. 19, 2021

(54) DISTRIBUTED STORAGE SYSTEM WITH OVERLAY NETWORK

(71) Applicant: Western Digital Technologies, Inc., San Jose, CA (US)

(72) Inventor: Kishore Kumar Reddy Devireddy, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 427 days.

(21) Appl. No.: 16/289,549

(22) Filed: Feb. 28, 2019

(65) Prior Publication Data

US 2020/0280492 A1 Sep. 3, 2020

(51) Int. Cl.
| | |
|---|---|
| G06F 15/177 | (2006.01) |
| H04L 12/24 | (2006.01) |
| H04L 12/715 | (2013.01) |
| H04L 12/46 | (2006.01) |
| H04L 29/08 | (2006.01) |
| H04L 12/931 | (2013.01) |

(52) U.S. Cl.
CPC ...... *H04L 41/0893* (2013.01); *H04L 12/4633* (2013.01); *H04L 41/20* (2013.01); *H04L 45/64* (2013.01); *H04L 49/356* (2013.01); *H04L 67/1097* (2013.01); *H04L 67/34* (2013.01)

(58) Field of Classification Search
CPC . H04L 41/0893; H04L 12/4633; H04L 41/20; H04L 45/64; H04L 49/356; H04L 67/1097; H04L 67/34
See application file for complete search history.

(56) References Cited

U.S. PATENT DOCUMENTS

| | | | |
|---|---|---|---|
| 7,624,265 B1 | 11/2009 | Slyva et al. | |
| 9,282,027 B1* | 3/2016 | Brandwine | ......... H04L 12/1836 |
| 10,044,795 B2 | 8/2018 | Reddy | |
| 2012/0014386 A1* | 1/2012 | Xiong | ................. H04L 12/4675 |
| | | | 370/392 |
| 2014/0112349 A1* | 4/2014 | Moreno | ............. H04L 12/4633 |
| | | | 370/400 |
| 2017/0279624 A1* | 9/2017 | He | .......................... H04L 12/18 |
| 2017/0317919 A1* | 11/2017 | Fernando | ............ H04L 41/0806 |
| 2019/0123962 A1* | 4/2019 | Guo | ......................... H04L 41/20 |
| 2020/0045148 A1* | 2/2020 | Mishra | .................... H04L 69/22 |
| 2020/0274738 A1* | 8/2020 | Gu | ...................... H04L 12/4633 |
| 2020/0274828 A1* | 8/2020 | Alapati | ................. H04L 49/356 |

OTHER PUBLICATIONS

Galán-Jiménez et al., Overlay Networks: Overview, Applications and Challenges, ResearchGate Publication, Dec. 2010 (https://www.researchgate.net/profile/Jaime_Galan-Jimenez/publication/256838933_Overlay_Networks_Overview_Applications_and_Challenges/links/5b5ec70da6fdccf0b2007940/Overlay-Networks-Overview-Applications-and-Challenges.pdf).

* cited by examiner

*Primary Examiner* — Oleg Survillo
(74) *Attorney, Agent, or Firm* — Patent Law Works LLP

(57) ABSTRACT

Technology for establishing network communications over an overlay network among nodes of configurable network computer systems, such as the storage system nodes of a hyper-converged infrastructure system is disclosed. The nodes are configured for communication over an overlay network and overlay endpoints corresponding to the nodes are enabled for encapsulating network communications between overlay endpoints. The nodes may then communicate over a common overlay subnetwork even though they operate in different local subnetworks with different subnetwork configurations. An installer may be similarly configured for network communications with the nodes over the overlay subnetwork.

20 Claims, 8 Drawing Sheets

DISTRIBUTED STORAGE SYSTEM WITH OVERLAY NETWORK

TECHNICAL FIELD

The present disclosure generally relates to configurable network computer systems. In a more particular non-limiting example, the present disclosure relates to distributed storage systems enabled for communication over an overlay network.

BACKGROUND

Hyper-converged infrastructure systems are systems for integrating processing, storage, and networking components of a multi-component computing system. Unlike converged systems, in which building blocks of the sub-systems remain discrete (e.g., the storage sub-system and the server sub-system are separate), hyper-converged infrastructure systems use virtualization to manage workloads through a single interface (e.g., a top-of-the-rack switch). The hyper-converged infrastructure includes multiple node elements (e.g., bare metal computer systems), with their own compute, storage, and networking capabilities. These node elements and their corresponding top-of-the-rack switch (or pair of switches) are generally configured and managed as a storage rack system, which may correspond to a physical racking system with rack unit slots for receiving and interconnecting the node hardware. The number of node elements is determined based on the capacity requirements and can be changed dynamically over time. Hyper-converged infrastructure systems may include storage system nodes configured for use as object storage systems.

In some instances, rack systems may be configured at a manufacturing facility for use in another location, such as a customer site. Each customer site may include a local network configured with one or more subnetworks for interconnecting network resources at that site. Customers may maintain rack systems in multiple sites and each rack system may be separately configured for their respective site's local network and subnetwork. These network configurations may need to be stored in each node element of the rack system. If the rack system is moved between sites, these network configurations may need to be updated for the new local network and subnetwork and may be incapable of network communications until such reconfigurations are complete.

In some instances, an installer may install the operating configuration for the storage system nodes through the top-of-the-rack switch when the rack system is in a manufacturing facility. However, due to network configuration, the installer may not be able discover and send network communications to storage system nodes at other facilities due to incompatible subnetwork configurations.

More reliable, efficient, and automated system for communicating among storage rack systems with different local network environments in a distributed storage system may be needed. Improved flexibility for communication between installers and storage rack systems with different local network environments may also be needed.

SUMMARY

The present disclosure generally relates to configurable network computer systems, such as storage system nodes in hyper-converged infrastructure systems and installers for configuring such storage system nodes. For instance, the disclosure describes technology capable of establishing overlay network communications among a plurality of storage rack systems and/or installers.

One general aspect includes a storage system including a first storage rack system configured to operate in a first subnetwork and including a first plurality of nodes configured for network communication within an overlay subnetwork. The storage system also includes a second storage rack system configured to operate in a second subnetwork and including a second plurality of nodes configured for network communication within the overlay subnetwork. A first overlay endpoint is configured to receive network communication from the first plurality of nodes over the overlay network, determine a destination node in the second plurality of nodes, encapsulate the network communication for routing to a second overlay endpoint associated with the second rack system, and send the encapsulated network communication to the second overlay endpoint over a network. A second overlay endpoint is configured to receive the encapsulated network communication, extract the network communication, and send the network communication to the destination node over the overlay subnetwork. The overlay subnetwork, the first subnetwork, and the second subnetwork are configured with different subnetwork configurations.

Some implementations may include one or more of the following features. The storage system may also include an installer configured to establish network communications with the first plurality of nodes using the overlay subnetwork, determine an install target node from the first plurality of nodes, and install an overlay operating configuration on the install target node using the overlay subnetwork. The storage system may further include a third overlay endpoint, where the installer is operating in a third subnetwork, network communications for the installer are routed through the third overlay endpoint, and the third subnetwork is configured with a subnetwork configuration that is different from subnetwork configurations of the first subnetwork and the second subnetwork. The installer may be further configured to receive a first install request from the install target node using the overlay subnetwork, responsive to receiving the first install request, initiate installing the overlay operating configuration on the install target node, receive a second install request from a local target node using the third subnetwork, and install a local operating configuration on the local target node using the third subnetwork. The first storage rack system may be configured to: power down in a first location connected to the first subnetwork, where the first plurality of nodes is further configured with a first set of network configurations for the overlay subnetwork; restart in a second location connected to a third subnetwork, where the third subnetwork is configured with a subnetwork configuration that is different from the first subnetwork; and send network communications through the overlay subnetwork from the second location using the first set of network configurations. The first overlay endpoint may be in the first storage rack system. The first overlay endpoint may be further configured to: power down in the first location connected to the first subnetwork, where the first overlay endpoint has a first network configuration for the first subnetwork; restart in the second location connected to the third subnetwork; receive a third network configuration for the third subnetwork; and route, responsive to receiving the third network configuration for the third subnetwork, network communications for the first plurality of nodes using the overlay subnetwork. The first storage rack system may further include at least one top-of-the-rack switch and the first overlay endpoint may be installed in the at least one top-of-the-rack switch. The first storage rack system may further include a plurality of top-of-the-rack switches and an instance of the first overlay endpoint may be installed in each top-of-the-rack switch of the plurality of top-of-the-rack switches. The at least one top-of-the-rack switch may include at least one processor, at least one memory, and an overlay tagging circuit configured to encapsulate and decapsulate network communications through the overlay subnetwork.

Another general aspect may include a computer-implemented method including: configuring a first storage rack system for network communication within an overlay subnetwork, where the first storage rack system is configured to operate in a first subnetwork; configuring a second storage rack system for network communication within the overlay subnetwork, where the second storage system is configured to operate in a second subnetwork; receiving, at a first overlay endpoint, network communication from a first node in the first storage rack system; determining a destination node in the second storage rack system; encapsulating the network communication for routing to a second overlay endpoint associated with the second rack system; sending the encapsulated network communication to the second overlay endpoint over a network; receiving, at the second overlay endpoint, the encapsulated network communication; extracting the network communication; and sending the network communication to the destination node over the overlay subnetwork, where the overlay subnetwork, the first subnetwork, and the second subnetwork are configured with different subnetwork configurations.

Some implementations may include one or more of the following features. The computer-implemented method may also include: establishing, from an installer, network communications with the first storage rack system using the overlay subnetwork; determining an install target node from a first plurality of nodes in the first storage rack system; and installing an overlay operating configuration on the install target node using the overlay subnetwork. The installer may operate in a third subnetwork. Network communications for the installer may be routed through a third overlay endpoint. The third subnetwork may be configured with a subnetwork configuration that is different from subnetwork configurations of the first subnetwork and the second subnetwork. The computer-implemented method may further include: receiving, at the installer, a first install request from the install target node using the overlay subnetwork; responsive to receiving the first install request, initiating installing the overlay operating configuration on the install target node; receiving, at the installer, a second install request from a local target node using the third subnetwork; and installing a local operating configuration on the local target node using the third subnetwork. The computer-implemented method may further include: powering down the first storage rack system in a first location connected to the first subnetwork, where a first plurality of nodes in the first storage rack system is configured with a first set of network configurations for the overlay subnetwork; restarting the first storage rack system in a second location connected to a third subnetwork, where the third subnetwork is configured with a subnetwork configuration that is different from the first subnetwork; and sending network communications through the overlay subnetwork from the first storage rack system in the second location using the first set of network configurations. The first overlay endpoint may be in the first storage rack system. The computer-implemented method may also include: powering down the first overlay endpoint in the first location connected to the first subnetwork, where the first overlay endpoint has a first network configuration for the first subnetwork; restarting the first overlay endpoint in the second location connected to the third subnetwork; receiving, in the first overlay endpoint, a third network configuration for the third subnetwork; and routing, responsive to receiving the third network configuration for the third subnetwork, network communications for the first plurality of nodes using the overlay subnetwork. The first storage rack system may further include at least one top-of-the-rack switch and the first overlay endpoint may be installed in the at least one top-of-the-rack switch. The first storage rack system may further include a plurality of top-of-the-rack switches and an instance of the first overlay endpoint may be installed in each top-of-the-rack switch of the plurality of top-of-the-rack switches.

Another general aspect may include a first storage rack system configured to operate in a first subnetwork and including a first plurality of nodes configured for network communication within an overlay subnetwork. The system also includes a second storage rack system configured to operate in a second subnetwork and including a second plurality of nodes configured for network communication within the overlay subnetwork. The system also includes means for receiving, at a first overlay endpoint, network communication from a first node from the first plurality of nodes. The system also includes means for determining a destination node in the second storage rack system. The system also includes means for encapsulating the network communication for routing to a second overlay endpoint associated with the second rack system. The system also includes means for sending the encapsulated network communication to the second overlay endpoint over a network. The system also includes means for receiving, at the second overlay endpoint, the encapsulated network communication. The system also includes means for extracting the network communication. The system also includes means for sending the network communication to the destination node over the overlay subnetwork, where the overlay subnetwork, the first subnetwork, and the second subnetwork are configured with different subnetwork configurations.

Some implementations may include one or more of the following features. The system may also include means for establishing, from an installer, network communications with the first storage rack system using the overlay subnetwork. The system may also include means for determining an install target node from the first plurality of nodes in the first storage rack system. The system may also include means for installing an overlay operating configuration on the install target node using the overlay subnetwork. The system may also include means for powering down the first storage rack system in a first location connected to the first subnetwork, where the first plurality of nodes in the first storage rack system is configured with a first set of network configurations for the overlay subnetwork. The system may also include means for restarting the first storage rack system in a second location connected to a third subnetwork, where the third subnetwork is configured with a subnetwork configuration that is different from the first subnetwork. The system may also include means for sending network communications through the overlay subnetwork from the first storage rack system in the second location using the first set of network configurations.

The various embodiments advantageously apply the teachings of configurable network computer systems, such as distributed storage systems, to improve the functionality of such computer systems. The various embodiments include operations to overcome or at least reduce the issues in the previous configurable network computer systems discussed above and, accordingly, make network configurations more reliable and/or efficient than other computing systems. That is, the various embodiments disclosed herein include hardware and/or software with functionality to improve the configuration of network communications when storage rack systems are moved among different local network environments, such as by using an overlay network for communication among storage system nodes and/or installers. Accordingly, the embodiments disclosed herein provide various improvements to storage networks and/or storage systems.

It should be understood, however, that the above list of features is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes technology, which may include methods, systems, apparatuses, computer program products, and other aspects, for routing network communications among nodes of a configurable network computing system using an overlay network. In the following description, for purposes of explanation, numerous specific details are set forth to provide a thorough understanding of the various aspects of different example embodiments. It will be evident, however, that any particular example embodiment may in various cases be practiced without all of the specific details and/or with variations, permutations, and combinations of the various features and elements described herein.

Figure 1:
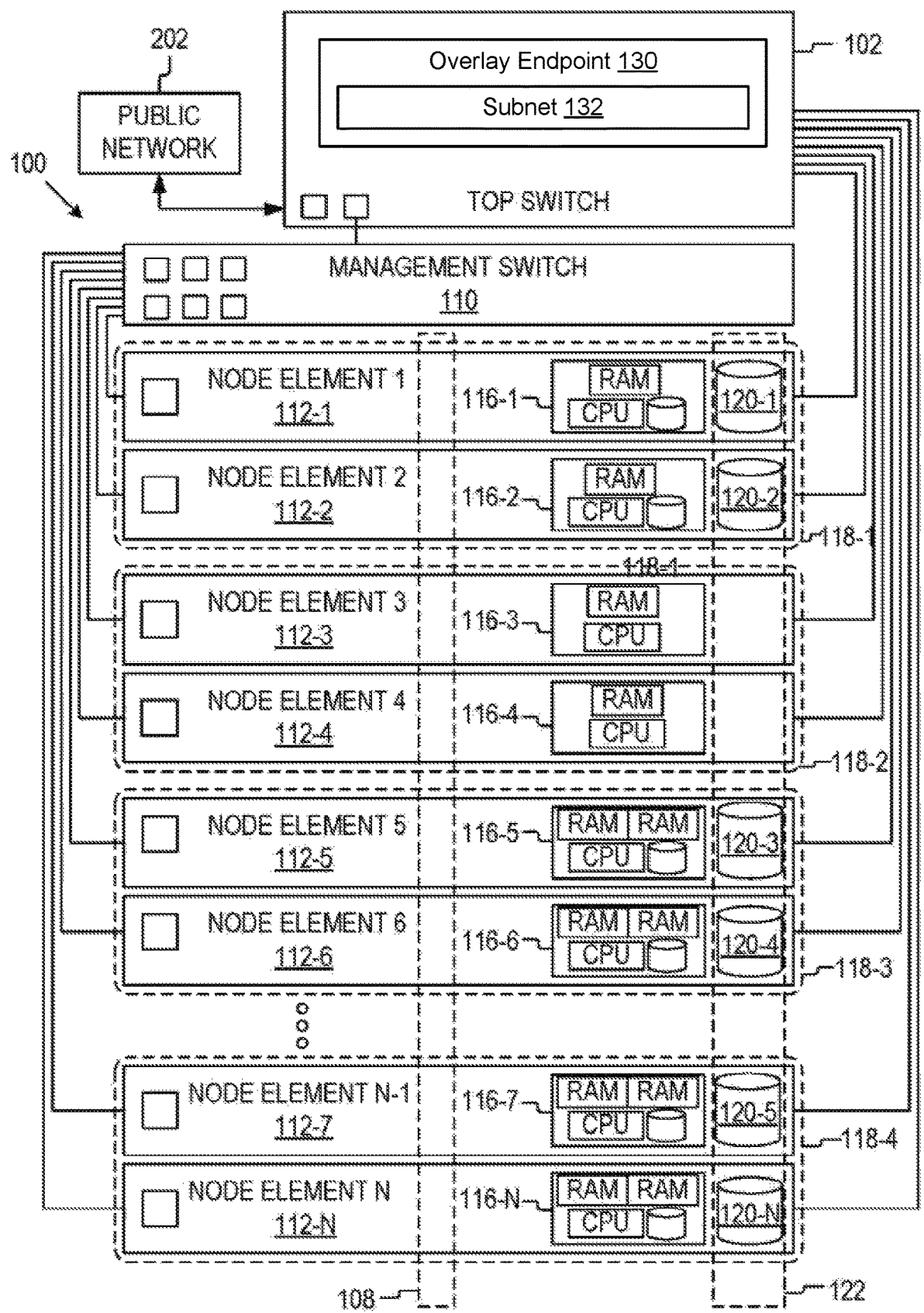
FIG. 1 is a schematic illustration of an example computing system.

FIG. 1 is a schematic illustration of an example computing system, such as a configurable network computing system. The computing system may be a hyper-converged infrastructure system 100 that includes a top switch 102 (or top-of-the-rack switch), a management switch 110, and a plurality of node elements 112-1 to 112-N. It should be recognized that when there are multiple instances of a similar element are depicted they will be labeled with the same reference number followed by a dash ("-") and another number or letter (e.g., 112-3) to designate different instances. In the event a reference numeral appears in the text without a dash and subsequent number or letter, for example, "112," it should be recognized that such is a general reference to different embodiments of the element or component bearing that general reference numeral.

In some embodiments, the top switch 102 may include a pre-installed operating system (OS), such as a Linux operating system. In some embodiments, the operating system may include a kernel-based virtual machine. In some embodiments, top switch 102 and/or the virtual machine may run or host an overlay endpoint 130 for receiving and sending communications on an overlay network subnet 132. In some embodiments, the virtual machine may also run a pre-boot execution environment, a dynamic host configuration protocol, federated control plane, and/or a software defined storage system. The top switch 102 may be connected to a public network 202 through a network communication port.

In some embodiments, the overlay endpoint, also referred to as an overlay network end point (ONEP), may include a hardware and/or software configurations for sending and receiving local network communications over subnet 132 and encapsulating and extracting network communications over public network 202 intended for network addresses on subnet 132. The overlay endpoint may decouple network services from the underlying (local) network infrastructure and the public network infrastructure used to carry network communications by encapsulating one packet inside another packet. After overlay endpoint 130 encapsulates and sends a packet to a remote overlay endpoint, such as an overlay endpoint in the top switch of a rack system at another site, the encapsulated packet is de-encapsulated or extracted and routed to the local network resource based on the overlay subnetwork address.

In some embodiments, the pre-boot execution environment may include a series of prebuilt operating system images. As new node elements 112 are added to the system 100, the pre-boot execution environment installs or boots the images into the newly added node element 112. The dynamic host configuration protocol may be configured with a range of IP address that can be allocated to node elements 112 as needed. In some embodiments, prebuilt operating system images and/or host/network configurations may be provided by a separate system, such as an installer system that is directly connected to top switch 102 or connects via public network 202.

In some embodiments, the federated control plane may be used to discover new node elements 112 after the new node elements are attached to the top switch 102 and have been given an IP address by a dynamic host configuration protocol (DHCP). The federated control plane may analyze a node element 112 to determine the capabilities of the node element 112. Potential capabilities include working memory (e.g., amount of RAM available to a particular node element 112), the speed of working memory (e.g., how fast are reads and writes executed), the speed and throughput of the one or more processors, the amount of storage available to the node element 112, and so on. The federated control plane may partition the newly added node element 112 into a particular node partition group (118-1 to 118-4) based on the determined capabilities of the newly added node element 112. In some embodiments, one or more node partition groups may include storage system nodes.

The software defined storage system may receive information about the storage resources of the node elements 112-1 to 112-N from the federated control plane. Using this information, the software defined storage system may create a global storage pool 122 that can be accessed as a single virtualized storage pool. In some embodiments, storage pool 122 and/or portions thereof may be configured as an object storage system.

A management switch 110 may connect to the top switch 102 and to the intelligent platform management interface (IPMI) of the nodes to collect information about the status of the plurality of node elements 112-1 to 112-N, including but not limited to the temperature, voltages, fans, power supplies, and so on of the node elements 112-1 to 112-N. The management switch 110 may also query information from the nodes (e.g., logged status information or inventory information) and perform some recovery procedures. Any relevant information may then be passed on to the top switch 102.

A node may include one or more processors, memory, and, in some embodiments, storage. The processing, memory, and storage resources 116-1 to 116-N of node elements 112-1 to 112-N may define the capabilities of the node element 112. In some example embodiments, a node may include computer system(s) without independent operating systems (e.g., bare metal machines). The node elements may be the same type of bare metal system (e.g., with the same resources) or different types of bare metal systems (e.g., with resources that vary by node element). In addition, a node element 112 may connect to the management switch 110 to report status information through the IPMI and connects to the top switch 102 for high-speed data transmission (e.g., information used to perform the tasks assigned by the federated control plane). In some embodiments, a node may include an operating system and other suitable computing components.

The memory resources of a node may include computer memory. For example, the computer memory included in a particular node may include high-speed random-access memory, such as dynamic random-access memory (DRAM), static random-access memory (SRAM), double data rate random-access memory (DDR RAM), or other random-access solid state memory devices, although other suitable memory devices are also possible and contemplated.

Storage resources may include in a given node may include non-volatile memory, such as one or more magnetic disk storage devices, optical disk storage devices, flash memory devices, or other non-volatile solid state storage devices. The memory and storage resources, or alternatively, the non-volatile memory device(s) within the memory and storage resources, comprise(s) a non-transitory computer-readable storage medium.

The processing resources of a node may be based on the one or more processors included within the node. Processors included in a node can include a variety of different processors including, but not limited to, a computer processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof. A processor may include both single core and multi-core processors that may comprise two or more independent processors (also referred to as "cores") that may execute the instructions contemporaneously. Thus, a node may include a single processor with a single core, a single processor with multiple cores (e.g., a multi-core processor), multiple processors with a single core, multiple processors with multiple cores, or any combination thereof. In addition, nodes can use a plurality of different processor architecture types including but not limited to the x86 processor architecture, the advanced RISC machine (ARM) architecture, the Power PC architecture, and so on.

In the example embodiment shown in FIG. 1, four different node partition groups are displayed, 118-1 to 118-4. A particular node partition group 118 is associated with different capabilities and different resources 116. For example, node partition group 1 118-1 includes node elements 112-1 and 112-2 which have resources 116-1 and 116-2 and storage units 120-1 and 120-2 respectively. Each node partition group 118-1 to 118-4 may have different storage and processing resources and be allocated for specific types of tasks.

Figure 2:
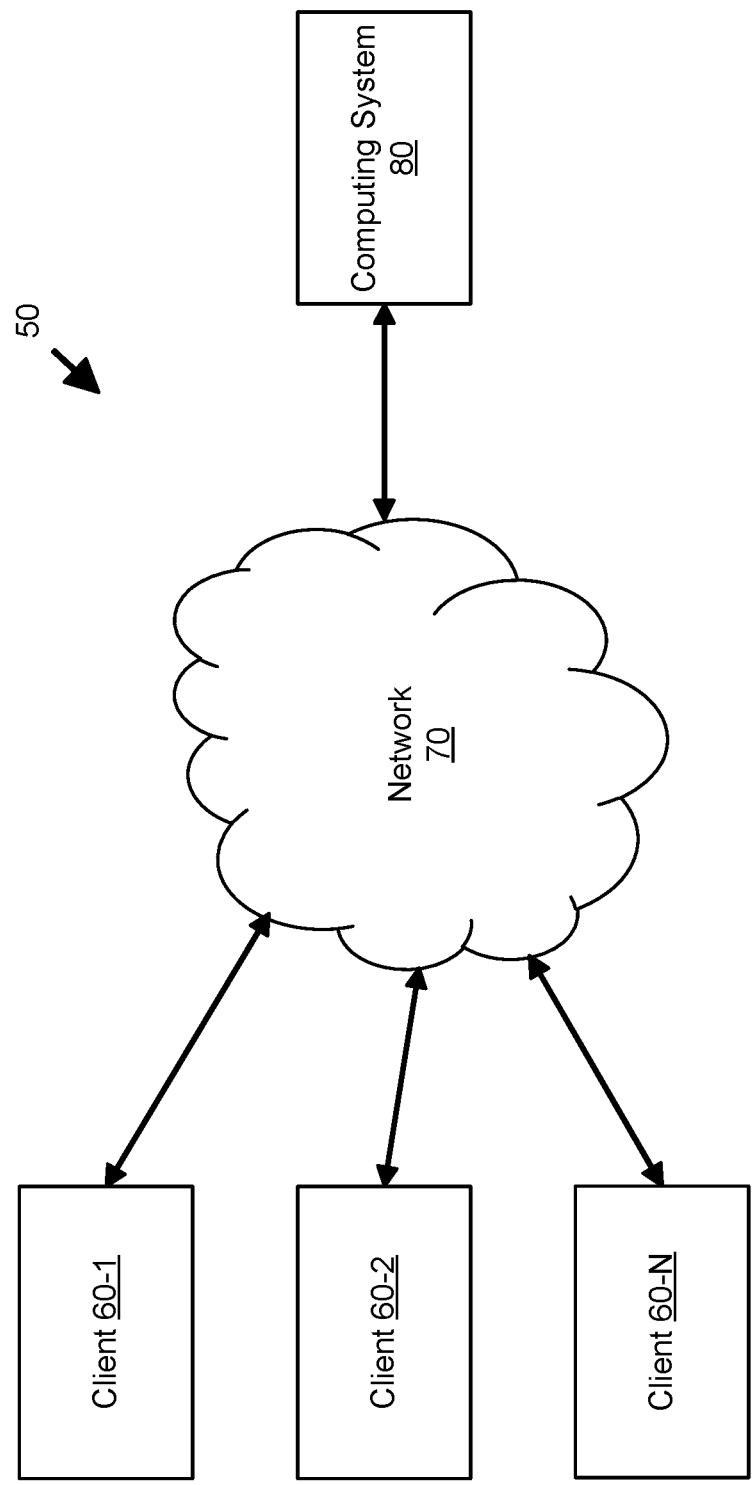
FIG. 2 is a schematic illustration of example computing systems connected over a network.

FIG. 2 is a schematic illustration of an example computing system 80 connected over a network 70 to a plurality of client systems 60-1 to 60-N to form distributed computer system 50. Network 70 may be a conventional type, wired or wireless, and may have numerous different configurations including a star configuration, token ring configuration, or further configurations. Network 70 may include a wide area network (WAN) (e.g., the Internet), a local area network (LAN), a virtual private network (VPN), and/or further interconnected data paths across which multiple devices may communicate. In some instances, network 70 may be a peer-to-peer network. Network 70 may also be coupled to or includes portions of a telecommunications network for sending data in a variety of different communication protocols.

Computing system 80 may be communicatively connected over signal lines to network 70. Client systems 60 may be communicatively connected over signal lines to network 70. Users may be interact with the client systems 60. For example, the user may use an object storage system hosted across distributed computing system 50 on computing system 80 by interacting with, for example, client system 60-1. In some embodiments, an installer may be hosted on one or more client systems 60 for configuring nodes in computing system 80.

In some embodiments, client systems 60 are client devices that include non-transitory memor(ies), processor(s), and communication unit(s), and other components that are communicatively coupled via a communications bus. Client systems 60 may couple to the network 70 and can send and receive data to and from other distributed computing system 50 entities. Non-limiting examples of client systems 60 include a laptop computer, a desktop computer, a tablet computer, a mobile telephone, a personal digital assistant (PDA), a mobile email device, a wearable device, an embedded computing device, or any other electronic device capable of processing information and accessing network 70.

Figure 3:
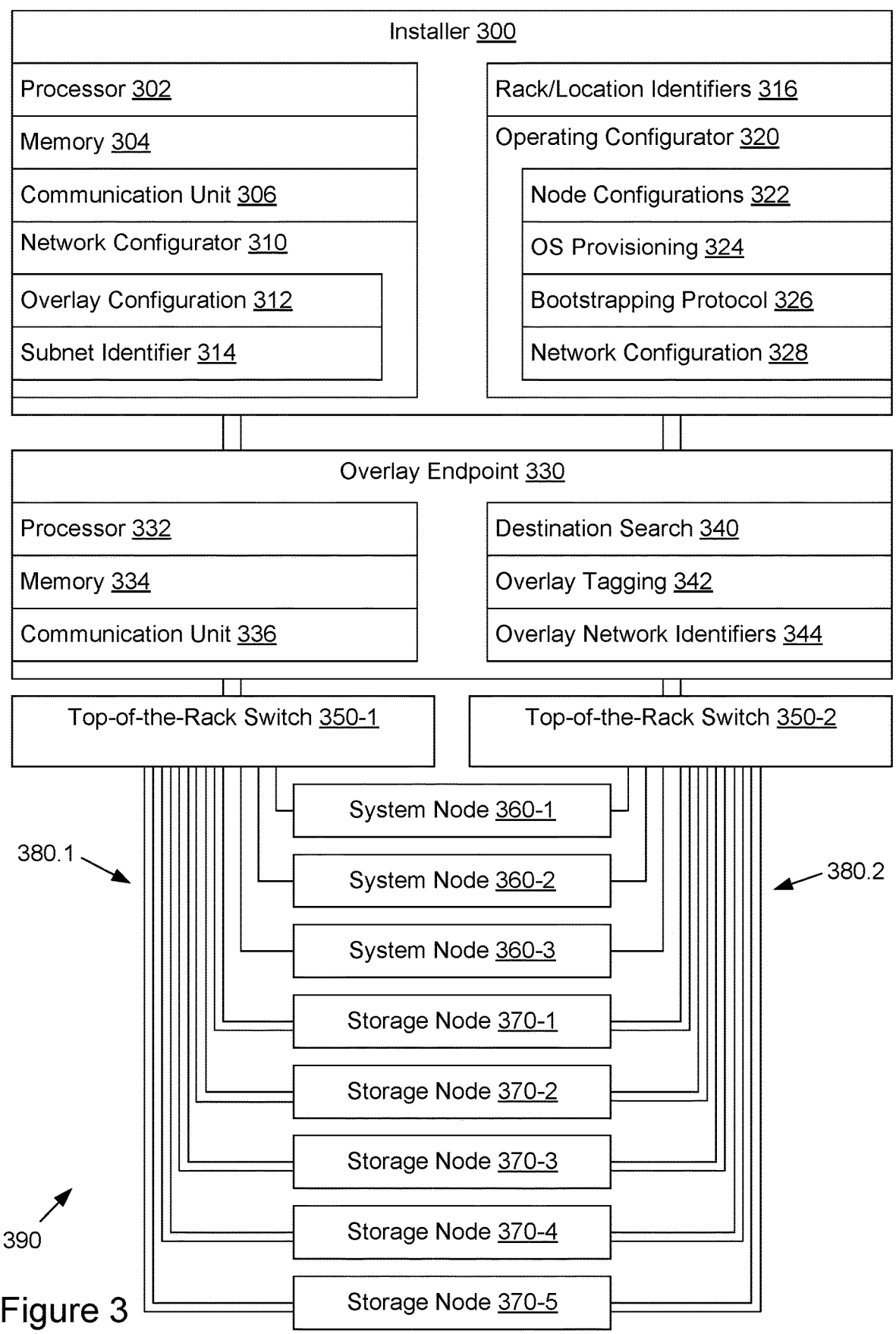
FIG. 3 is a block diagram of an example installer, overlay endpoint, and rack storage system.

FIG. 3 is a block diagram of an example installer 300 and configurable network computing system, such as a rack system 390, including an overlay endpoint 330. Note that while the term 'top switch' is used to refer to item 350, particularly in describing FIG. 3, in other parts of the application top switch 350 may alternatively be referred to as 'fabric element', or simply 'computing device'. While the functionality of these various terms may be split amongst more than one computer device, for simplicity the functionality is often combined in to a single switch or pair of switches and thus is illustrated as such in this description.

Installer 300 may include or be hosted on a computing system that includes a processor 302, a memory 304, and a communication unit 306. Installer 300 may also include network configurator 310, rack/location identifiers 316 and operating configurator 320 instantiated in memory 304 for execution by processor 302 or as separate subsystems, such as one or more hardware subsystems with their own processors, memory, and interface. In some implementations, the components of installer 300 are communicatively coupled by a bus.

Processor 302 may include an arithmetic logic unit, a microprocessor, a general-purpose controller, or some other processor array to perform computations and provide electronic display signals to a display device. Processor 302 may be coupled to a bus for communication with the other components. Processor 302 may process data signals and may include various computing architectures including a complex instruction set computer (CISC) architecture, a reduced instruction set computer (RISC) architecture, or an architecture implementing a combination of instruction sets. Although FIG. 3 includes a single processor 302, multiple processors 302 may be included. Further processors, operating systems, sensors, displays and physical configurations are possible.

Memory 304 may include one or more non-transitory computer readable media. Memory 304 may store instructions and/or data that may be executed by processor 302. Memory 304 may be coupled to a bus for communication with the other components. The instructions and/or data may include code for performing the techniques described herein. Memory 304 may be a dynamic random access memory (DRAM) device, a static random access memory (SRAM) device, flash memory, or some other memory device. In some instances, the memory 304 also includes a non-volatile memory or similar permanent storage device and media including a hard disk drive, a floppy disk drive, a compact disk read only memory (CD ROM) device, a digital versatile disk read only memory (DVD ROM) device, a digital versatile disk random access memory (DVD RAM) device, a digital versatile disk read/write (DVD RW) device, a flash memory device, or some other mass storage device for storing information on a more permanent basis.

Communication unit 306 may transmit and receive data to and from a network and/or networked components, such as top switches 350. Communication unit 306 may be coupled to a bus for communication with other components. In some instances, communication unit 306 may include a port for direct physical connection to the network, other components, or to another communication channel. For example, communication unit 306 may include a universal serial bus (USB), secure digital (SD), category 6 (CAT-6) or similar port for wired communication with the network. In some instances, the communication unit 306 includes a wireless transceiver for exchanging data with the network or other communication channels using one or more wireless communication methods, including Institute of Electrical and Electronics Engineers (IEEE) 802.11, IEEE 802.16, BLUETOOTH® or another suitable wireless communication method. Although FIG. 3 includes a communication unit 306, multiple communication units 306 may be included.

In some instances, communication unit 306 includes a cellular communications transceiver for sending and receiving data over a cellular communications network including via short messaging service (SMS), multimedia messaging service (MMS), hypertext transfer protocol (HTTP), direct data connection, wireless application protocol (WAP), e-mail or another suitable type of electronic communication. In some instances, communication unit 306 includes a wired port and a wireless transceiver. Communication unit 306 may also provide other conventional connections to the network for distribution of files and/or media objects using standard network protocols including transmission control protocol/internet protocol (TCP/IP), HTTP, HTTP secure (HTTPS), secure sockets layer (SSL), and simple mail transfer protocol (SMTP), etc.

In some configurations, installer 300 may communicate with top switches 350 (or top-of-the-rack switches 350), either directly as a local resource on the same subnet or remotely through overlay endpoint 330. For example, communication unit 306 may include one or more ports that may be wired to corresponding ports in top switches 350, if they are in the same physical location. In some embodiments, installer 300 may be directly connected to top switches 350 and/or may connect to top switches 350 over a switched network, such as a local area network or public network. In some embodiments, installer 300 may be on the same subnet as top switches 350 and communicate through the local area network. In some embodiments, installer 300 may be on a different subnet or an entirely different local network in another physical location from top switches 350 and communicate through overlay endpoints, such as overlay endpoint 330. Note that while only a single overlay endpoint 330 is shown in FIG. 3, overlay communications may most commonly pass through multiple overlay endpoints, such as a first overlay endpoint for encapsulating packets at a source end and a second overlay endpoint for extracting packets at a destination end.

Top switches 350 may connect to a plurality of nodes, such as in rack system 390 in a hyper-converged infrastructure system or distributed storage system. For example, top switches 350 may each connect to system nodes 360 and storage nodes 370 and enable redundant networks paths 380 for communication between or among system nodes 360 and storage nodes 370. In some configurations, client systems (not shown) may be coupled to system nodes 360 via a client network (not shown).

An example rack system configuration, redundant network paths 380 may include a first system network connecting system nodes 360 and storage nodes 370 to top switch 350-1 and a second system network connecting system nodes 360 and storage nodes 370 to top switch 350-2. These system networks may enable system communications among system nodes 360 and storage nodes 370. Redundant network paths 380 may also include a first storage network connecting storage nodes 370 to top switch 350-1 and a second storage network connecting storage nodes 370 to top switch 350-1. These storage networks may enable storage communications, such as movement of client data, among storage nodes 370. Installer 300 may be configured to communicate on both system networks and storage networks. In the example rack system configuration, network paths 380, including both the system networks and storage networks, may be configured with a common networking protocol and corresponding network addresses. In some embodiments, these network addresses may correspond to overlay network addresses for communication through overlay endpoint 330.

In the implementation shown in FIG. 3, installer 300 may include network configurator 310 and operating configurator 320 for installing and/or reinstalling an operating configuration for some or all of storage system nodes 360 and 370. For example, during a first installation, installer 300 may configure one or more network paths to support selected network protocols, such as at least one storage network among storage nodes 370 and at least one system network among system nodes 360 and storage nodes 370. These networks may be configured with overlay network settings, including overlay network addresses for each of the storage system nodes 360 and 370 with a known overlay subnet mask for overlay endpoint 330. For example, installer 300 may include a default address convention for assigning static IP address default values and set related network configuration parameters in each of storage system nodes 360 and 370. In some embodiments, other network protocols and corresponding network protocol addresses may be used for a primary communication network protocol with storage system nodes 360 and 370.

Installer 300 may also have a network protocol enabled for use over network paths 380 for use in configuring each of storage system nodes 360 and 370. For example, storage system nodes 360 and 370 may be assigned network addresses that uniquely identify them on the overlay network. In some embodiments, these network addresses may be discoverable in their respective networks (through top switches 350 and network paths 380). In some embodiments, installer 300 may be configured with its own overlay endpoint 330.

In some embodiments, the rack system may be separated from the installer and put into production use with one or more client systems. In production use, one or more of the local networks may be reconfigured to suit the particular client infrastructure and/or application. Reconfiguring the local networks may include changing the local network addresses using client-specific subnets or other network address changes. When the rack system is reconnected to installer 300, the change in local network addresses may render installer 300 initially incapable of communicating over the local networks to storage system nodes 360 and 370 due to the updated values for the local network addresses. However, the installer may still communicate with overlay endpoint 330 and, thereby, reach storage system nodes 360 and 370 over the overlay network.

Network configurator 310 may include overlay configuration 312 and overlay subnet identifier 314 for configuring the network configurations of storage system nodes 360 and 370. Overlay configurations 312 may include the overlay network addresses and other network configuration settings for storage system nodes 360 and 370 that enable them to send and receive network communications through the overlay network. Subnet identifier 314 may define the overlay subnet to be used by storage system nodes 360 and 370. In some embodiments, installer 300 may be used for rack systems on multiple overlay networks and may be configured to assign each rack system to a specified overlay subnetwork, such as an overlay subnetwork assigned to a particular client, region, other logical grouping of rack systems across physical and/or geographic locations.

In some embodiments, installer 300 may include or have access to rack/location identifiers 316. For example, rack/location identifiers 316 may include a table or other data structure that identifies the overlay networks assigned to each rack system and/or overlay network addresses assigned to each storage system node in those rack systems. In some embodiments, rack/location identifiers 316 may also include other information for the rack, such as geographic location, physical location (e.g. room or rack layout identifier), client, etc. for managing the maintenance of node configurations over time.

Operating configurator 320 may include protocols, parameters, and/or full or partial operating system images for setting operating system configurations for storage system nodes 360 and 370. For example, operating configurator 320 may be configured to install a default or custom node configuration in each of the nodes based on the hardware configurations of the nodes, storage system and/or application configurations, and/or client-defined parameters or configurations.

Operating configurator 320 may include node configurations 322, such as system node configurations for system nodes 360 and storage nodes configurations for storage nodes 370. As described above, system node configurations may be configured for more processor-oriented hardware and applications and storage node configurations may be configured for more storage-oriented hardware and applications. In some embodiments, system node configurations may be configured as storage controllers and storage node configurations may be configured as storage pools, such as arrays of sold state drives and/or hard disk drives.

Operating system provisioning 324 may enable operating configurator 320 to store or access operating system images and load them into storage system nodes 360 and 370. For example, operating system provisioning may include identifying the target nodes and corresponding configurations, initiating an installation session, and awaiting bootstrapping of the target nodes. Bootstrapping protocol 326 may allow the target nodes to bootstrap into their operating configuration over network communications with installer 300 and/or related install resources. For example, bootstrapping protocol 326 may enable an OS installer to be provided over the overlay network to boot the target node and download the appropriate operating system image and other operating configurations (e.g. system node configurations or storage nodes configurations). In some embodiments, operating configurator 320 may include a network configuration 328, such as the network configuration of network configurator 310, that is installed and/or configured through operating system provisioning 324.

Overlay endpoint 330 may include software and/or hardware for directing network communications to and from installer 300 and/or storage system nodes 360 and 370 via an overlay network with an overlay subnetwork configuration. An overlay network may include a virtual network topology on top of a plurality of existing networks that allows nodes configured and addressed within the overlay network to exchange network communications regardless of the local network configuration and basic transport protocols. For example, overlay endpoint 330 may send layer-2 packets over layer-3 networks by encapsulating the layer-2 packets within layer-3 packets. Overlay endpoint 330 may act as a gateway for network communications on the overlay network. Overlay endpoint 330 may receive network communications from local nodes communicating with other nodes on the overlay network and route those network communications to other overlay endpoints using another network configuration, such as internet protocols or other public networks, without the local nodes needing to know where the other nodes are or what network configurations they use.

Some example overlay network protocols include virtual extensible local area network (VXLAN), network virtualization using generic routing encapsulation (NVGRE), generic network virtualization encapsulation (GENEVE), and stateless transport tunneling (STT). Each of these overlay network protocols enable encapsulation of data packets for routing across different networks, while preserving subnetwork addressing and virtual topology. Overlay endpoints may be configured in accordance with these overlay network protocols to provide overlay network communications among nodes in their respective overlay networks, where the nodes may be configured normally for network communication on the overlay network subnet without knowledge that it is an overlay network. Overlay endpoints, such as overlay endpoint 330, may mask the operation of the overlay network from the local nodes it is connected to.

In some embodiments, overlay endpoint 330 may be configured as a computing device comprised of at least one processor 332, at least one memory 334, and at least one communication unit 336. In some embodiments, the computing device may be a dedicated overlay endpoint in network communication with other systems, such as installer 300 and top switches 350 of the configurable network computer system. In some embodiments, the overlay endpoint may be integrated into installer 300 and/or top switches 350 and share processor, memory, and/or communication unit resources with those systems. For example, an overlay endpoint may be enabled on a computing device hosting installer 300 or a virtual machine running within top switches 350. In another example, a hardware accelerated overlay endpoint may be installed in top switches 350, including an overlay tagging circuit configured to encapsulate and decapsulate network communications through the overlay subnetwork.

Processor 332 may include an arithmetic logic unit, a microprocessor, a general-purpose controller, or some other processor array to perform computations and provide electronic display signals to a display device. Processor 332 may be coupled to a bus for communication with the other components. Processor 332 may process data signals and may include various computing architectures including a complex instruction set computer (CISC) architecture, a reduced instruction set computer (RISC) architecture, or an architecture implementing a combination of instruction sets. Although FIG. 3 includes a single processor 332, multiple processors 332 may be included. Further processors, operating systems, sensors, displays and physical configurations are possible.

Memory 334 may include one or more non-transitory computer readable media. Memory 334 may store instructions and/or data that may be executed by processor 332. Memory 334 may be coupled to a bus for communication with the other components. The instructions and/or data may include code for performing the techniques described herein. Memory 334 may be a dynamic random access memory (DRAM) device, a static random access memory (SRAM) device, flash memory, or some other memory device. In some instances, the memory 334 also includes a non-volatile memory or similar permanent storage device and media including a hard disk drive, a floppy disk drive, a compact disk read only memory (CD ROM) device, a digital versatile disk read only memory (DVD ROM) device, a digital versatile disk random access memory (DVD RAM) device, a digital versatile disk read/write (DVD RW) device, a flash memory device, or some other mass storage device for storing information on a more permanent basis.

Communication unit 336 may transmit and receive data to and from a network and/or networked components, such as top switches 350. Communication unit 336 may be coupled to a bus for communication with other components. In some instances, communication unit 336 may include a port for direct physical connection to the network, other components, or to another communication channel. For example, communication unit 336 may include a universal serial bus (USB), secure digital (SD), category 6 (CAT-6) or similar port for wired communication with the network. In some instances, the communication unit 336 includes a wireless transceiver for exchanging data with the network or other communication channels using one or more wireless communication methods, including Institute of Electrical and Electronics Engineers (IEEE) 802.11, IEEE 802.16, BLU-ETOOTH® or another suitable wireless communication method. Although FIG. 3 includes a communication unit 336, multiple communication units 336 may be included.

Overlay endpoint 330 may include a plurality of functional modules embodied in hardware, software, or a combination thereof to perform overlay endpoint functions. In some embodiments, these modules may include destination search 340, overlay tagging 342, and overlay network identifiers 344. Additional modules may also be present, depending on the overlay protocol being used and other functions of the overlay endpoint.

Destination search 340 may enable overlay endpoint 330 to determine a destination overlay endpoint for network communications received from local nodes. For example, destination search 340 may include a lookup table or other data structure for organizing a directory of the overlay endpoints in the overlay network. In some embodiments, the directory of overlay endpoints may also include a listing of node addresses available at that overlay endpoint, hash function, or other indexing method such that destination search 340 may use the destination network address as an index for identifying the overlay endpoint associated with the destination node. Other overlay topologies and destination search configurations are possible, such as destination addressing based on broadcast, queries to peer overlay endpoints, forwarding by overlay endpoints, etc.

Overlay tagging 342 may enable overlay endpoint 330 to encapsulate packets received from local nodes for transfer to other overlay endpoints and to extract packets from encapsulated packets received from other overlay endpoints. For example, the overlay network protocol may define an overlay header, overlay frame, or other encapsulation data that is added to local data packets or removed from remote data packets. In some embodiments, an overlay tagging circuit may be used to add the encapsulation data to local packets addressed to remote nodes and remove the encapsulation data from remote packets addressed to local nodes. In some embodiments, the header may include an overlay protocol identifier and an overlay network identifier added to the original layer-2 frame received from the local node. Note that the overlay packets with the encapsulated data frames may then be packaged within a larger packet compatible with the network protocols being used to move the packets between overlay endpoints, such as outer user datagram protocol (UDP) headers, outer internet protocol (IP) headers, and outer ethernet headers.

Overlay network identifiers 344 may enable overlay endpoint 330 to manage multiple layer-2 overlay networks over the same layer-3 network channels. For example, each overlay network may be assigned a unique overlay network identifier that is included in each overlay network packet as described above for overlay tagging 342. Each overlay network identifier may correspond to a set of storage system nodes in the same overlay subnetwork, even though different storage rack systems hosting those nodes may be in different geographic or physical locations with different local network configurations. In some embodiments, overlay network identifiers 344 may be assigned to each logical grouping of storage rack systems, such as storage rack systems configured for a particular client.

Figure 4A:
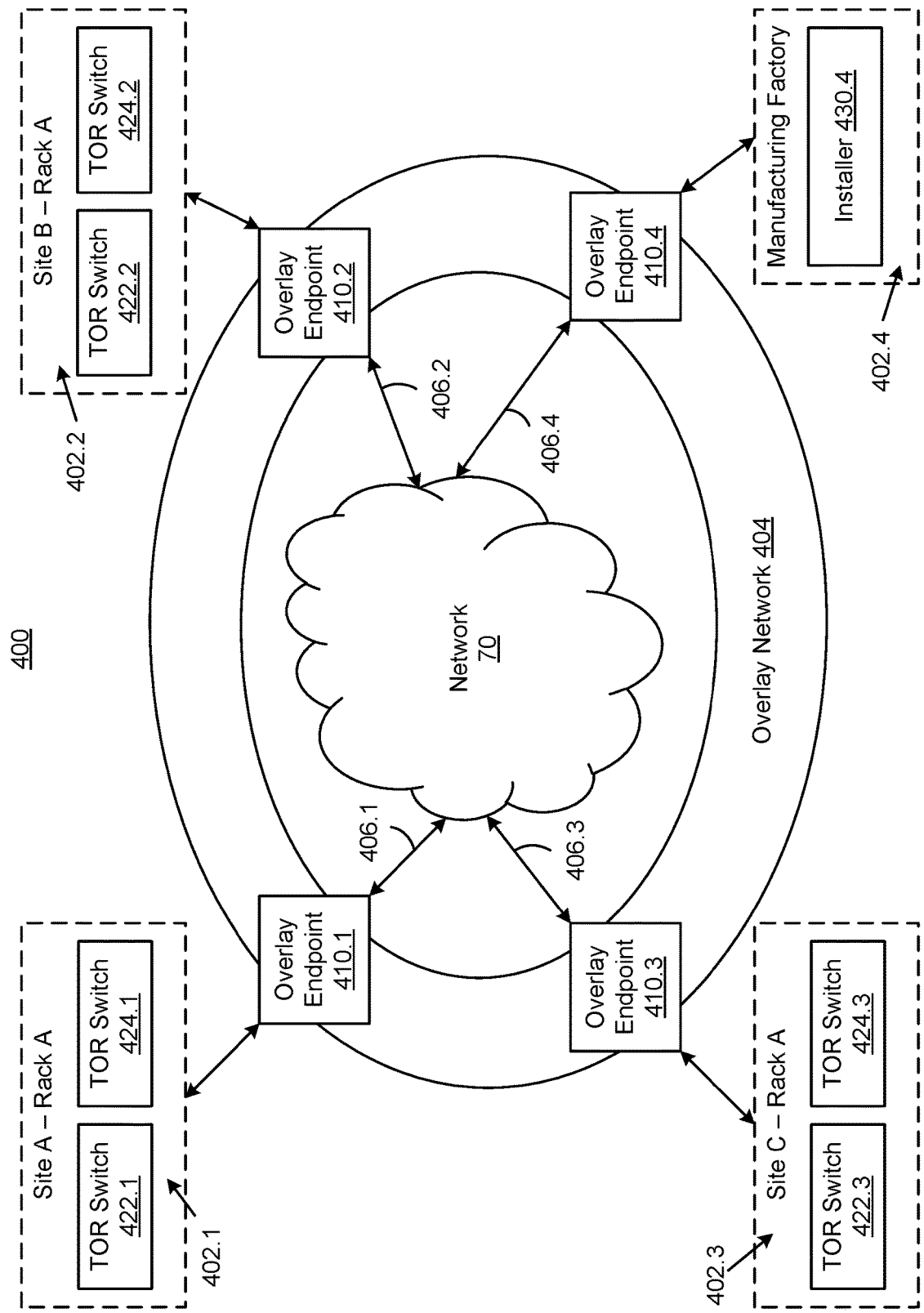
FIGS. 4A and 4B are block diagrams of example configurations of an overlay network for communication among storage system racks and installers at different locations.
Figure 4B:
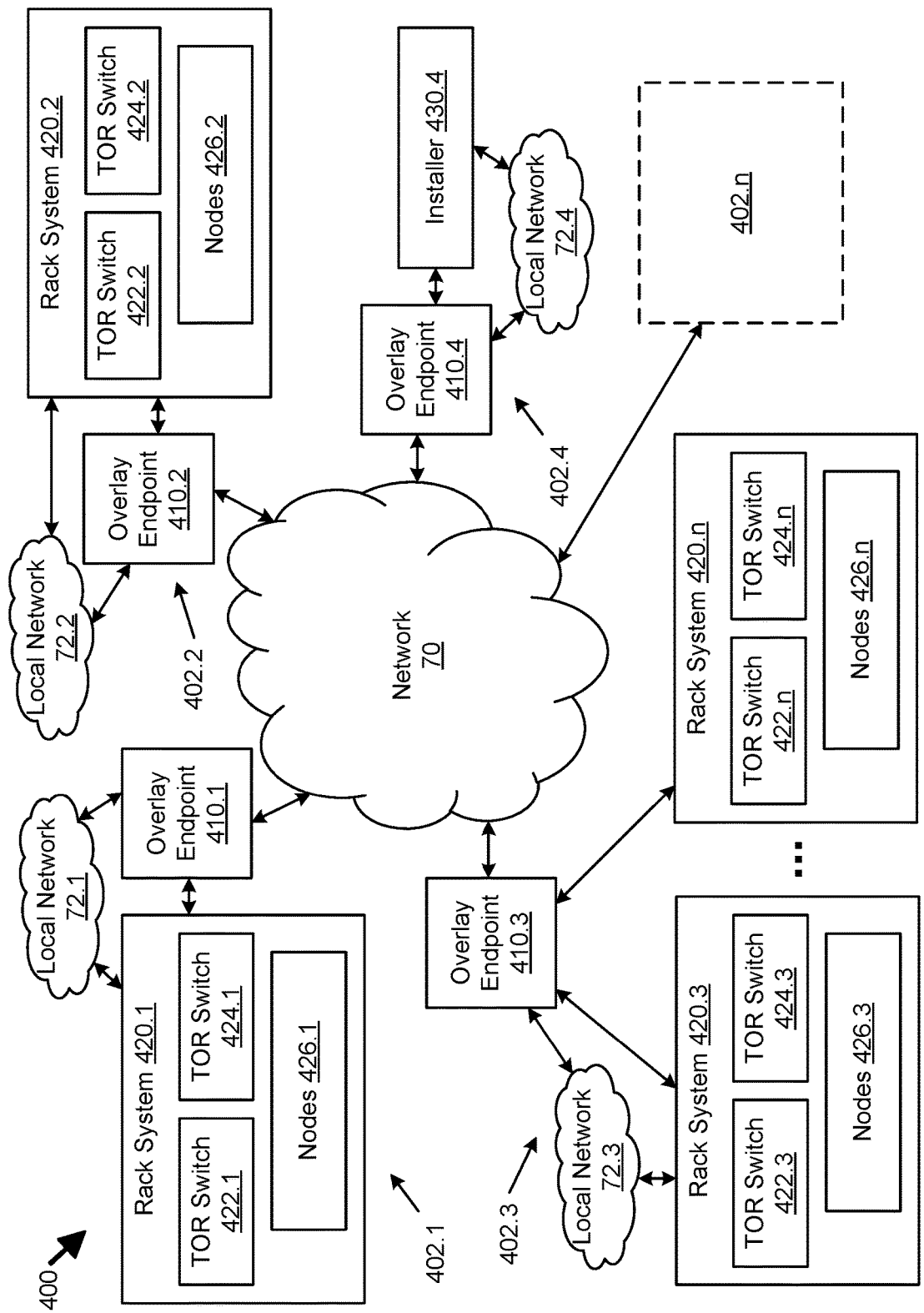

FIGS. 4A and 4B show block diagrams of example configurations of distributed storage system 400 that includes an overlay network 404 for network communication among storage system racks 420 and installers 430 at different locations 402. In the examples shown, the storage system racks and installers may be moved among different geographic or physical locations with different local subnetwork configurations, but still communicate with each other over overlay network 404 without having to reconfigure nodes 426.

In FIG. 4A, three locations 402 (Site A—Rack A at 402.1, Site B—Rack A at 402.2, and Site C—Rack A at 402.3) host rack systems that include a pair of Top of Rack (TOR) switches 422, 424. Each TOR switch 422, 424 may send network communications for overlay network 404 through their respective overlay endpoints 410. Overlay endpoints 410 may send encapsulated packets from the host rack systems and their respective TOR switches 422, 424 through multi site uplinks 406 to network 70, such as a wide area network or public network using internet protocols. In some embodiments, the overlay endpoints 410 are embedded in TOR switches 422, 424.

Location 402.4 shows an example manufacturing factory that hosts an installer 430.4. Installer 430.4 may be configured similarly to TOR switches 422, 424 to communicate through overlay network 404 using overlay endpoint 410.4. Each TOR switch 422, 424 may initially have been configured in location 402.4 by installer 430.4, before being transported to their respective locations 402, where they may have been reconfigured for local network configurations. Using overlay network 404, installer 430.4 may still communicate with each TOR switch 422, 424 to discover, configure, or reconfigure target storage system nodes attached to the TOR switch 422, 424.

In FIG. 4B, a number of locations 402 are shown, including locations 402.1, 402.2, and 402.3 (where rack systems 420.1, 420.2, and 420.3 are located), location 402.4 (where installer 430.4 is located), and additional locations 402.n (which could include any number of additional locations that may receive a rack system or installer configured for use of an overlay network). Locations 402 may include a plurality of different geographic locations, such as data centers in different cities, countries, or regions, and/or different physical locations, such as server rooms within a data center. Each location 402 may include one or more local networks 72 configured for network communication within the location or a subsegment thereof. For example, each local network 72 may be configured with one or more local subnetwork masks based on a local network topology and logical network configuration. For example, each local network 72 may include local layer-2 subnetworks configured for interoperability of local network nodes with local network configurations. These local subnetworks may include network configurations that are different than the overlay network supported by overlay endpoints 410. For example, the local subnetwork mask may be different than the overlay subnetwork mask.

Rack systems 420 may each include paired TOR switches 422, 424 and a plurality of nodes 426. For example, network communications to nodes 426 may be directed through TOR switches 422, 424. In some embodiments, nodes 426 may participate in local networks 72, sending and receiving network communications on local networks 72 through TOR switches 422, 424 using local network configurations and network addresses. TOR switches 422, 424 may be configured to route local network communications to the respective local networks 72. Nodes 426 may also be configured to participate in one or more overlay networks through overlay endpoints 410. For example, network communications on the overlay subnetwork may be routed to the respective local overlay endpoints 410 and overlay endpoints 410 may route packets for local nodes directly or encapsulate packets for remote destination nodes and forward them to one or more destination overlay endpoints.

Installer 430.4 may act similarly to rack systems 420 with regard to using local network 72.4 for communication with local nodes, such as a rack system in location 402.4 (not shown), and directing network communications through the overlay network through overlay endpoint 410.4 to reach remote nodes, such as nodes 426 in rack systems 420. In some embodiments, each of rack systems 420 may have initially been configured by installer 430.4 at location 402.4, before being moved to their respective production locations 402. Installer 430.4 may subsequently use the overlay network for communication with the remote rack systems 420. For example, installer 430.4 may discover nodes, receive an install request, and install an operating configuration over the overlay network to an install target node selected from remote nodes 426.

Figure 5:
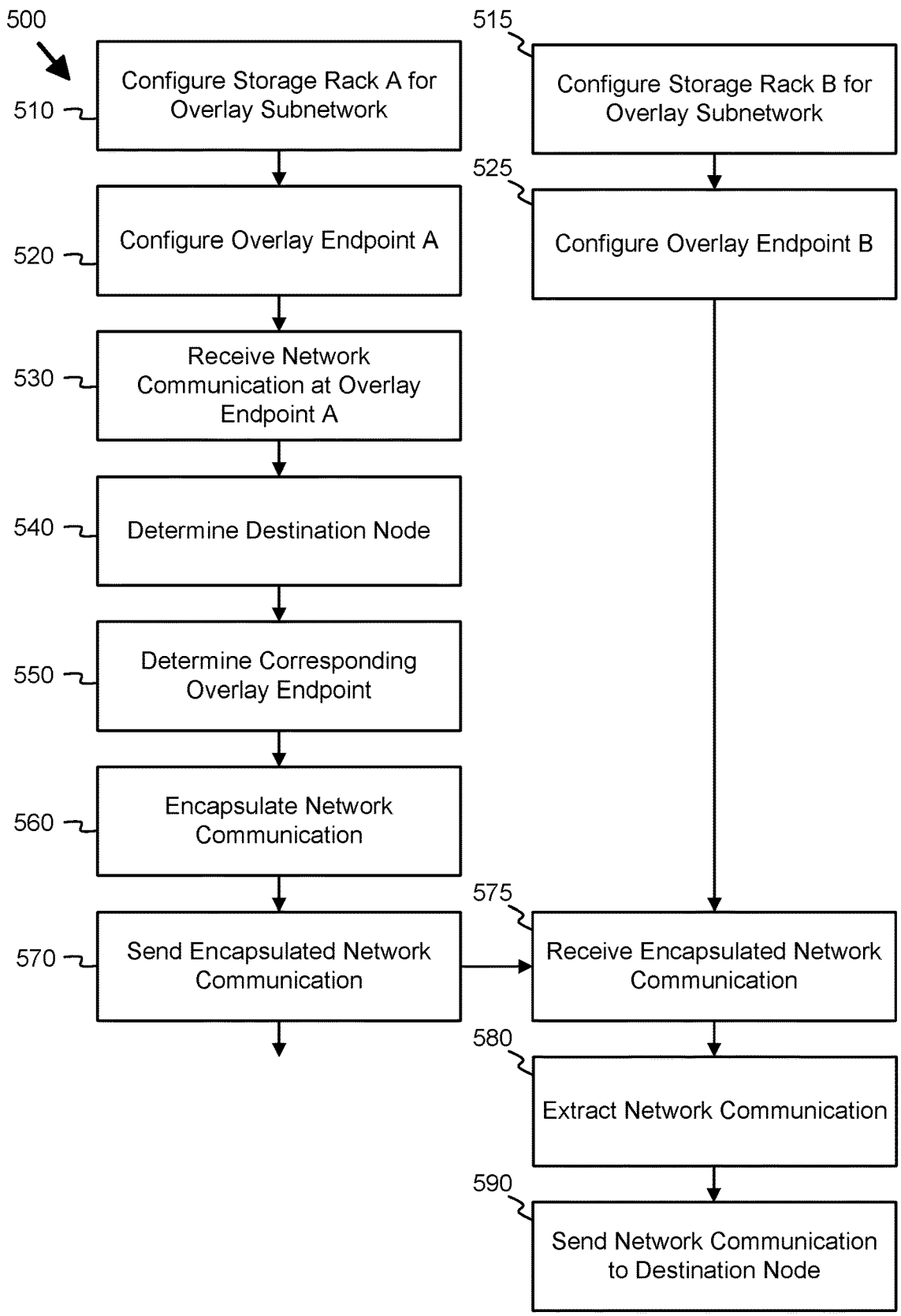
FIG. 5 is a flowchart of an example method for network communications between nodes over an overlay network.

FIG. 5 is a flowchart of a method 500 for network communications between nodes over an overlay network, including configuration of respective storage racks and overlay endpoints. Method 500 may, for example, be executed using a plurality of network configurable rack systems with associated overlay endpoints, such as hyperconverged infrastructure system 100 in FIG. 1 and/or rack systems 390, 420 of FIGS. 3 and 4. In the example shown, a first storage rack A is configured for communication with a second storage rack B over an overlay network. In some embodiments, the configuring blocks may be executed by an installer, such as installer 300, 430 in FIGS. 3 and 4.

At block 510, a storage rack A may be configured for network communications through an overlay network. For example, storage rack A may be connected to a local subnetwork and, for each of its nodes, receive local subnetwork configurations for local network communication and overlay subnetwork configurations for overlay network communication. In some embodiments, the network configurations may be received from an installer as part of a node configuration or reconfiguration process. At block 515, a storage rack B at a different location and with a different local subnetwork configuration may be configured similarly for network communications through the same overlay network.

At block 520, an overlay endpoint A may be configured for communications between local nodes in storage rack A and other overlay endpoints in the overlay network, such as overlay endpoint B. For example, overlay endpoint A may be configured for an overlay network identifier that both storage rack A and storage rack B will use for overlay network communications. In addition, overlay endpoint A may be configured for local communications using a local subnetwork configuration. In some embodiments, overlay endpoint A may be hosted or integrated into the top switch (or switches) of storage rack A. At block 525, overlay endpoint B may be configured for communications between local nodes in storage rack B and other overlay endpoints in the overlay network, such as overlay endpoint A.

At block 530, network communications may be received at overlay endpoint A, such as from one or more nodes of storage rack A. For example, one or more network packets with network addresses corresponding to the overlay network subnet may be received by overlay endpoint A over local network resources, such as the network paths within storage rack A.

At block 540, a destination node for the received network communications may be determined. For example, based on the network address, overlay endpoint A may determine whether the destination node is local to overlay endpoint A or at a remote location accessible through the overlay network. If the destination node is determined to be local, the overlay endpoint may forward the packet to the destination node without encapsulating, such as using the switching capabilities of one or more top switches of storage rack A or another local storage rack. If the destination node is determined to be remote, method 500 proceeds to block 550.

At block 550, an overlay endpoint for the destination node may be determined. For example, the network address of the packet may be used to index a directory of peer overlay endpoints that identifies their respective nodes. In the example shown, the destination node may be in storage rack B and overlay endpoint B may be identified as the corresponding overlay endpoint.

At block 560, the network communication packet may be encapsulated. For example, the layer-2 packet may have an overlay header with the overlay network identifier appended to it for routing as a layer-3 packet. In some embodiments, the overlay network protocol and the overlay network identifier for the specific overlay network may define the content and format of the overlay header.

At block 570, the encapsulated packet may be sent by overlay endpoint A to the overlay endpoint corresponding to the destination node, such as overlay endpoint B. For example, the encapsulated packet may be configured according to internet protocols, which may include that addition of additional headers, for routing to overlay endpoint B over a public network. At block 575, the encapsulated packet may be received by overlay endpoint B in accordance with the network protocols of the intervening network, without reference to the contents of the encapsulated packet.

At block 580, the original network communication may be extracted or decapsulated from the encapsulated packet by overlay endpoint corresponding to the destination node, such as overlay endpoint B. For example, the overlay header, as well as any other headers added for routing according to the intervening network protocols, may be removed such that only the original network communication sent by the originating node remains.

At block 590, the original network communication may be sent to the destination node. For example, overlay endpoint B may route the network communication to the destination node in storage rack B using the original layer-2 network address and local network resources.

Figure 6:
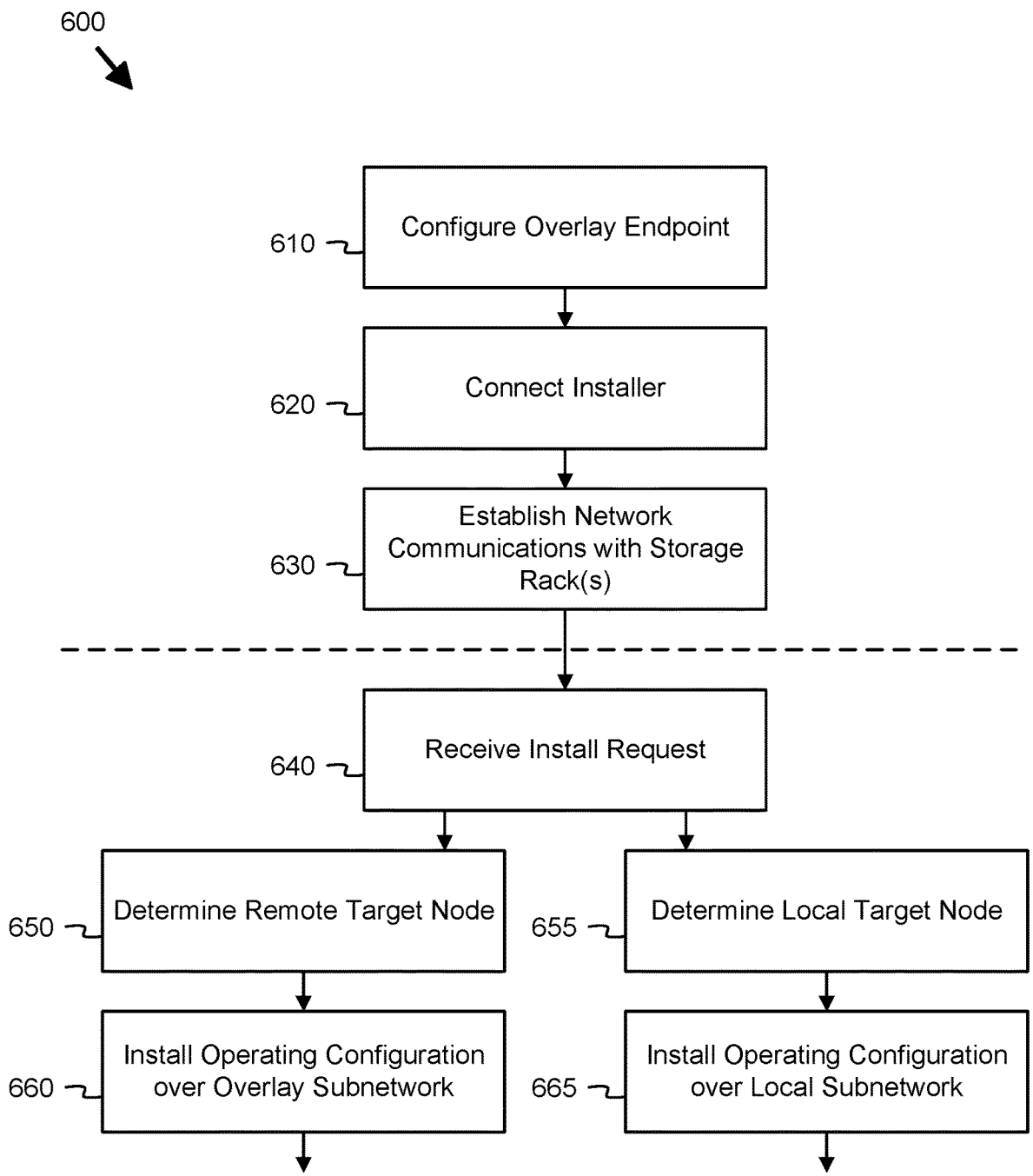
FIG. 6 is a flowchart of an example method for installing operating configurations over an overlay network.

FIG. 6 is a flowchart of an example method 600 for installing operating configurations on one or more target nodes over an overlay network. Method 500 may, for example, be executed by an installer system, such as installer 300 in FIG. 3 and/or installers 430 in FIGS. 4A and 4B.

At block 610, an overlay endpoint may be configured for network communication among a plurality of overlay endpoints. For example, the overlay endpoint may include an overlay network protocol and at least one overlay network identifier for identifying and routing communication to peer overlay endpoints over a public network. The overlay endpoint may also be configured for local network communications with one or more nodes using a local network configuration that is different than the public network configuration and the overlay network configuration.

At block 620, an installer may be connected to the overlay endpoint. For example, the overlay endpoint and the installer may use the same local network configuration an local network resources for communication, the installer may be directly connected to a rack system that includes an overlay endpoint within its top switch, or the installer itself may host an overlay endpoint using some or all of the same computing resources, such as processor, memory, and communication units.

At block 630, network communications may be established with one or more storage racks. For example, the installer may be configured for network communication across one or more subnetworks, including at least one subnetwork corresponding to the overlay network. In some embodiments, establishing network communications with the storage racks may include local network communications with one or more storage racks on a local subnetwork using local network resources and overlay network communications with one or more storage racks on overlay subnetworks available through the overlay endpoint.

At block 640, an install request may be received from one or more nodes in network communication with the installer. For example, the install request may be received from a node in any rack system with which network communications were established at block 630. In some embodiments, the install request may be received from a newly added node within an existing storage rack system or an entirely new storage rack system recently configured for and connected to the local subnetwork and/or overlay subnetwork.

At block 650, the install request may be determined to relate to a remote target node that is not accessible over a local subnetwork. For example, the install request may include a network address on the overlay subnetwork that corresponds to a node in a rack system in another physical or geographic location. At block 660, the installer may install an operating configuration in the target node specified in the install request over the overlay subnetwork. For example, the network address for the target node may be extracted from the install request and a selected operating configuration for that target node may be addressed to the target node using the overlay endpoint.

At block 655, the install request may be determined to relate to a local target node that is accessible over a local subnetwork. For example, the install request may include a network address on a local subnetwork that corresponds to a node in a rack system in the same physical or geographic location and configured on the same local subnetwork as the installer. At block 665, the installer may install a local operating configuration in the target node specified in the install request over the local subnetwork. For example, the network address for the target node may be extracted from the install request and a selected operating configuration for that target node may be addressed to the target node using local network resources.

Figure 7:
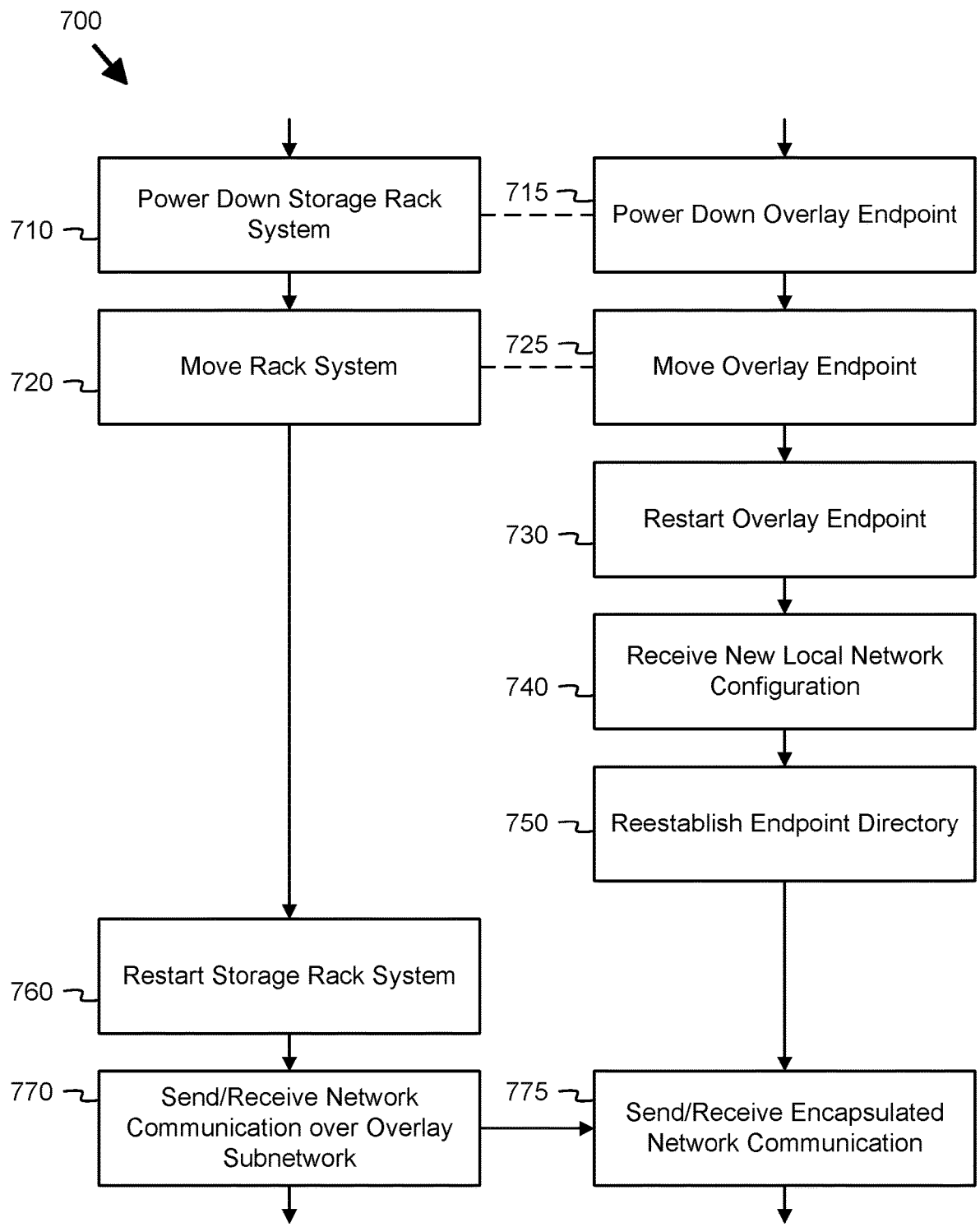
FIG. 7 is a flowchart of an example method for moving a storage rack system between local network environments.

FIG. 7 is a flowchart of a method 700 for moving a storage rack system between local network environments without having to reconfigure the network configurations of the nodes within the rack system. Method 700 may, for example, be executed using a network configurable rack system with associated overlay endpoints, such as hyperconverged infrastructure system 100 in FIG. 1 and/or rack systems 390, 420 of FIGS. 3 and 4. In some embodiments, the overlay endpoint is integral to and/or moved with the storage rack system. In other embodiments, the storage rack system may be disconnected from an overlay endpoint in one location and connected to an overlay endpoint in another location, as long as both overlay endpoints are configured for the same overlay network protocol and overlay network identifier to support the overlay subnetwork used by the rack system.

At block 710, a storage rack system may be powered down. For example, the rack system may be taken offline and the power to the rack system and its nodes may be turned off and, ultimately, disconnected from the local power source. At block 715, an associated overlay endpoint may also be powered down. For example, the overlay endpoint may be integrated into the rack system, such as hosted in the top-of-the-rack switches, or may be a separate computing device through which the rack system connected to the overlay network. In some embodiments, an associated overlay endpoint may not need to be powered down and moved because the new location already has an overlay endpoint to which the rack system may be connected after the move.

At block 720, the rack system may be moved from a first physical or geographic location to a second physical or geographic location that is different than the first. For example, the rack system may be moved from one server room to another, where the server rooms are configured on different local subnets, or shipped from a data center in one city to a data center in another city, where the data centers have different local network configurations. At block 725, the overlay endpoint may be moved along with one or more rack systems. If the overlay endpoint has been moved between locations with different local network configurations, method 700 may proceed to blocks 730-750.

At block 730, the overlay endpoint may be restarted at the new locations. For example, the endpoint may be powered on in the new location prior to restarting the nodes in the storage rack system. At block 740, the overlay endpoint may receive a new local network configuration for the network resources available at the new location. For example, the overlay endpoint may be configured to use a local subnetwork for reaching a public network to communicate with other overlay endpoints. At block 750, the overlay endpoint may reestablish its endpoint directory for routing overlay network communications. For example, the overlay endpoint may query or broadcast to other previously known peer overlay endpoints in accordance with overlay network protocols for updates on the updated and active list of overlay endpoints and associated overlay subnetwork addresses. The overlay endpoint may rebuild its endpoint directory for one or more overlay network identifiers.

At block 760, the storage rack system may be restarted. For example, the storage rack system may be installed in a new location and connected to appropriate network and power resources, the top switches and other fabric components may be restarted, and then one or more nodes within the storage rack system may be restarted.

At block 770, nodes within the storage rack system may begin sending and receiving network communications over the overlay subnetwork. For example, restarted nodes may send network communications on the overlay subnetwork to the overlay endpoint using the same network configuration settings they used in the original location and no reconfiguration of individual node network configurations may be necessary to reestablish this connection. At block 775, the overlay endpoint may send and receive encapsulated network communication related to the original network communications sent and to be received by the storage rack nodes. For example, the overlay endpoint and the storage rack nodes may operate using the overlay network as described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and/or all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context

What is claimed is:

1. A computer-implemented method, comprising:
   configuring a first storage rack system for network communication within an overlay subnetwork, wherein the first storage rack system operates in a first subnetwork;
   configuring a second storage rack system for network communication within the overlay subnetwork, wherein the second storage system operates in a second subnetwork;
   receiving, at a first overlay endpoint, network communication from a first node in the first storage rack system;
   determining a destination node in the second storage rack system;
   encapsulating the network communication for routing to a second overlay endpoint associated with the second rack system;
   sending the encapsulated network communication to the second overlay endpoint over a network;
   receiving, at the second overlay endpoint, the encapsulated network communication;
   extracting the network communication; and
   sending the network communication to the destination node over the overlay subnetwork, wherein the overlay subnetwork, the first subnetwork, and the second subnetwork are configured with different subnetwork configurations.

2. The computer-implemented method of claim 1, further comprising:
   establishing, from an installer, network communications with the first storage rack system using the overlay subnetwork;
   determining an install target node from a first plurality of nodes in the first storage rack system; and
   installing an overlay operating configuration on the install target node using the overlay subnetwork.

3. The computer-implemented method of claim 2, wherein:
   the installer is operating in a third subnetwork;
   network communications for the installer are routed through a third overlay endpoint; and
   the third subnetwork is configured with a subnetwork configuration that is different from subnetwork configurations of the first subnetwork and the second subnetwork.

4. The computer-implemented method of claim 3, further comprising:
   receiving, at the installer, a first install request from the install target node using the overlay subnetwork;
   responsive to receiving the first install request, initiating installing the overlay operating configuration on the install target node;
   receiving, at the installer, a second install request from a local target node using the third subnetwork; and
   installing a local operating configuration on the local target node using the third subnetwork.

5. The computer-implemented method of claim 1, further comprising:
   powering down the first storage rack system in a first location connected to the first subnetwork, wherein a first plurality of nodes in the first storage rack system is configured with a first set of network configurations for the overlay subnetwork;
   restarting the first storage rack system in a second location connected to a third subnetwork, wherein the third subnetwork is configured with a subnetwork configuration that is different from the first subnetwork; and
   sending network communications through the overlay subnetwork from the first storage rack system in the second location using the first set of network configurations.

6. The computer-implemented method of claim 5, wherein the first overlay endpoint is in the first storage rack system, and further comprising:
   powering down the first overlay endpoint in the first location connected to the first subnetwork, wherein the first overlay endpoint has a first network configuration for the first subnetwork;
   restarting the first overlay endpoint in the second location connected to the third subnetwork;
   receiving, in the first overlay endpoint, a third network configuration for the third subnetwork; and
   routing, responsive to receiving the third network configuration for the third subnetwork, network communications for the first plurality of nodes using the overlay subnetwork.

7. The computer-implemented method of claim 1, wherein:
   the first storage rack system further comprises at least one top-of-the-rack switch; and
   the first overlay endpoint is installed in the at least one top-of-the-rack switch.

8. The computer-implemented method of claim 7, wherein:
   the first storage rack system further comprises a plurality of top-of-the-rack switches; and
   an instance of the first overlay endpoint is installed in each top-of-the-rack switch of the plurality of top-of-the-rack switches.

9. A storage system, comprising:
   a first storage rack system configured to operate in a first subnetwork and including a first plurality of nodes configured for network communication within an overlay subnetwork;
   a second storage rack system configured to operate in a second subnetwork and including a second plurality of nodes configured for network communication within the overlay subnetwork;

a first overlay endpoint configured to:
  receive network communication from the first plurality of nodes over the overlay subnetwork;
  determine a destination node in the second plurality of nodes;
  encapsulate the network communication for routing to a second overlay endpoint associated with the second storage rack system; and
  send the encapsulated network communication to the second overlay endpoint over a network; and
a second overlay endpoint configured to:
  receive the encapsulated network communication;
  extract the network communication; and
  send the network communication to the destination node over the overlay subnetwork, wherein the overlay subnetwork, the first subnetwork, and the second subnetwork are configured with different subnetwork configurations.

10. The storage system of claim 9, further comprising an installer configured to:
  establish network communications with the first plurality of nodes using the overlay subnetwork;
  determine an install target node from the first plurality of nodes; and
  install an overlay operating configuration on the install target node using the overlay subnetwork.

11. The storage system of claim 10, further comprising a third overlay endpoint, wherein:
  the installer is configured to operate in a third subnetwork;
  network communications for the installer are configured to be routed through the third overlay endpoint; and
  the third subnetwork is configured with a subnetwork configuration that is different from subnetwork configurations of the first subnetwork and the second subnetwork.

12. The storage system of claim 11, wherein the installer is further configured to:
  receive a first install request from the install target node using the overlay subnetwork;
  responsive to receiving the first install request, initiate installing the overlay operating configuration on the install target node;
  receive a second install request from a local target node using the third subnetwork; and
  install a local operating configuration on the local target node using the third subnetwork.

13. The storage system of claim 9, wherein the first storage rack system is further configured to:
  power down in a first location connected to the first subnetwork, wherein the first plurality of nodes is further configured with a first set of network configurations for the overlay subnetwork;
  restart in a second location connected to a third subnetwork, wherein the third subnetwork is configured with a subnetwork configuration that is different from the first subnetwork; and
  send network communications through the overlay subnetwork from the second location using the first set of network configurations.

14. The storage system of claim 13, wherein the first overlay endpoint is in the first storage rack system and the first overlay endpoint is further configured to:
  power down in the first location connected to the first subnetwork, wherein the first overlay endpoint has a first network configuration for the first subnetwork;
  restart in the second location connected to the third subnetwork;
  receive a third network configuration for the third subnetwork; and
  route, responsive to receiving the third network configuration for the third subnetwork, network communications for the first plurality of nodes using the overlay subnetwork.

15. The storage system of claim 9, wherein:
  the first storage rack system further comprises at least one top-of-the-rack switch; and
  the first overlay endpoint is installed in the at least one top-of-the-rack switch.

16. The storage system of claim 15, wherein:
  the first storage rack system further comprises a plurality of top-of-the-rack switches; and
  an instance of the first overlay endpoint is installed in each top-of-the-rack switch of the plurality of top-of-the-rack switches.

17. The storage system of claim 15, wherein the at least one top-of-the-rack switch comprises:
  at least one processor;
  at least one memory; and
  an overlay tagging circuit configured to encapsulate and decapsulate network communications through the overlay subnetwork.

18. A system, comprising:
  a first storage rack system configured to operate in a first subnetwork and including a first plurality of nodes configured for network communication within an overlay subnetwork;
  a second storage rack system configured to operate in a second subnetwork and including a second plurality of nodes configured for network communication within the overlay subnetwork;
  means for receiving, at a first overlay endpoint, network communication from a first node from the first plurality of nodes;
  means for determining a destination node in the second storage rack system;
  means for encapsulating the network communication for routing to a second overlay endpoint associated with the second storage rack system;
  means for sending the encapsulated network communication to the second overlay endpoint over a network;
  means for receiving, at the second overlay endpoint, the encapsulated network communication;
  means for extracting the network communication; and
  means for sending the network communication to the destination node over the overlay subnetwork, wherein the overlay subnetwork, the first subnetwork, and the second subnetwork are configured with different subnetwork configurations.

19. The system of claim 18, further comprising:
  means for establishing, from an installer, network communications with the first storage rack system using the overlay subnetwork;
  means for determining an install target node from the first plurality of nodes in the first storage rack system; and
  means for installing an overlay operating configuration on the install target node using the overlay subnetwork.

20. The system of claim 18, further comprising:
  means for powering down the first storage rack system in a first location connected to the first subnetwork, wherein the first plurality of nodes in the first storage rack system is configured with a first set of network configurations for the overlay subnetwork;
  means for restarting the first storage rack system in a second location connected to a third subnetwork, wherein the third subnetwork is configured with a subnetwork configuration that is different from the first subnetwork; and means for sending network communications through the overlay subnetwork from the first storage rack system in the second location using the first set of network configurations.

* * * * *